United States Patent
Buccetti et al.

(10) Patent No.: US 10,417,712 B2
(45) Date of Patent: Sep. 17, 2019

(54) ENTERPRISE APPLICATION HIGH AVAILABILITY SCORING AND PRIORITIZATION SYSTEM

(71) Applicant: Hartford Fire Insurance Company, Hartford, CT (US)

(72) Inventors: John G. Buccetti, Wallingford, CT (US); Gurunatham Pellakuru, Ellington, CT (US); Kenneth A. Saucier, Bristol, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 249 days.

(21) Appl. No.: 14/519,938

(22) Filed: Oct. 21, 2014

(65) Prior Publication Data
US 2016/0110817 A1   Apr. 21, 2016

(51) Int. Cl.
*G06Q 40/08* (2012.01)
(52) U.S. Cl.
CPC .................... *G06Q 40/08* (2013.01)
(58) Field of Classification Search
CPC ..................................... G06Q 40/08
USPC ............................................. 705/4
See application file for complete search history.

(56) References Cited

U.S. PATENT DOCUMENTS

| | | | |
|---|---|---|---|
| 6,901,347 B1 | 5/2005 | Murray et al. | |
| 8,335,947 B2 | 12/2012 | Hoffmann | |
| 2004/0230858 A1 | 11/2004 | Susskind | |
| 2004/0230872 A1 | 11/2004 | Mullally et al. | |
| 2004/0230953 A1 | 11/2004 | Garzia et al. | |
| 2006/0129367 A1 | 6/2006 | Mishra et al. | |
| 2009/0150717 A1 | 6/2009 | Lee et al. | |
| 2010/0268565 A1* | 10/2010 | Trinon | G06Q 10/06 709/223 |
| 2011/0313949 A1 | 12/2011 | Bishop et al. | |

OTHER PUBLICATIONS

Prasanna Kumara; "Data Mining and Its Significance in Industrial Applications"; ISSN: 0976-5697; Mar.-Apr. 2012. (Year: 2012).*

* cited by examiner

*Primary Examiner* — Edward Chang
(74) *Attorney, Agent, or Firm* — Howard IP Law Group

(57) ABSTRACT

Embodiments provide a system for prioritizing maintenance of a portfolio of enterprise applications, comprising: a database storing risk scoring data; a the portfolio of enterprise applications; a processor that accesses a risk score from the database for a plurality of the enterprise applications; the processor prioritizing, based on the risk scoring data, a subset of the enterprise applications from the plurality for availability analysis; the processor accessing availability data stored in the database relating to technical readiness and operational maturity scores; the processor calculating an availability score for each of the enterprise applications in the subset; the processor comparing each of the enterprise applications in the subset to a corresponding predetermined benchmark using an availability score for each of the enterprise applications in the subset; and an output device that outputs an indication comparing each of the enterprise applications in the subset to a corresponding predetermined benchmark.

16 Claims, 7 Drawing Sheets

| B | C | D | E | F | G | H | I | J | K | L | M |
|---|---|---|---|---|---|---|---|---|---|---|---|
| | | | Availability Scoring | | | | | | | | |
| | | | Enterprise HA Risk Score v2 2.xlsx | | | | | | | | |
| Externally hosted application? | | No | Contracted Avail SLA | | | | Mainframe App? | No | | | |
| | Technical Readiness | | | | | | Operational Maturity | | | | |
| App Layer | Presentation | Application | Database | Storage | Sub-Total | Config Scan | Monitor | Capacity | H/A Restore Documentation | Data Backup/Rest | Sub-Total |
| 1. Score | 9 | 9 | 6 | 9 | 132 | 6 | 9 | 6 | 12 | 3 | 69 |
| 2. Risk | | | | | | | | | | | |
| 3. Availability Total | 201 | | | | | | | | | | |
| 4. Tier Target | Gold (99.95%) | | | | | | | | | | |
| 5. Availability Result | Fail | | | | | | | | | | |

FIG. 2

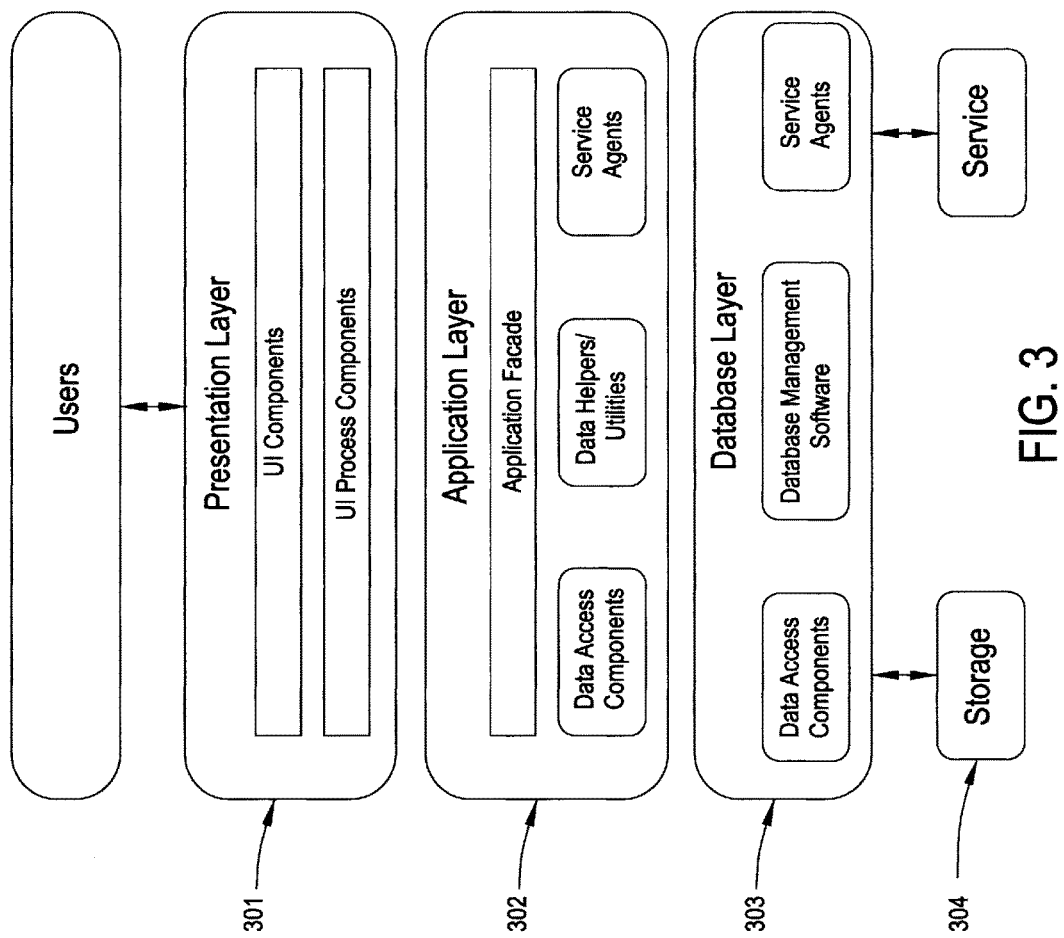

| | A | B | C | D | E | F | G | H | I | J | K | L | M |
|---|---|---|---|---|---|---|---|---|---|---|---|---|---|
| 1 | | Technical Readiness Attributes | | | | | | | | | | | |
| 2 | | Presentation | | | Application | | | Database | | | Storage | | |
| 3 | Description | Application's presentation tier, (IIS, SunOne, Apache, etc). Note: some Apps may not have a presentation tier, e.g. (batch) | | | Tier hosting the Application, (.NET, Weblogic, Tomcat, Oracle Forms, Perl, etc) | | | Application DB tier, (SQL, Oracle, DB2) | | | Application data storage, (NAS, SAN, local DASD) | | |
| 4 | | Single server with single instance | No | 0 | Single instance running on a single server | No | 0 | Single instance running on a single server | No | 0 | Server local DASD RAID Config | No | 0 |
| 5 | Only choose 1 of 3 for Pres/App/DB | Multiple instances across multiple servers in active/passive mode | No | 0 | Multiple instances across multiple servers in active/passive mode | No | 0 | Multiple instances across multiple servers in active/passive mode | Yes | 6 | NAS and/or SAN qtree auto fail - diverse fabric, zones redund path | No | 0 |
| 6 | If N/A set flag in each box | Multiple instances across multiple servers in active/active load balanced or clustered mode | Yes | 9 | Multiple instances across multiple servers in active/active load balanced or clustered mode | Yes | 9 | Multiple instances across multiple servers in active/active load balanced or clustered mode | No | 0 | NAS and/or SAN qtree auto fail - diverse fabric, zones redund path - App access storage via alias | Yes | 9 |

| | A | B | C | D | E | F | G | H | I | J | K | L | M | N | O | P |
|---|---|---|---|---|---|---|---|---|---|---|---|---|---|---|---|---|
| 1 | | | | | Operational Maturity Attributes | | | | | | | | | | | |
| 2 | | Config Scan (automated) | | | Monitoring | | | Capacity | | | Restore/Doc | | | Backup/Restore Test | | |
| 3 | Description | Blade logic and/or BMC ADDM tools impl to scan config file consistency across dependant nodes | | | Automated availability monitoring via tool integration, (BMC, Sitescope, Grid, i3, etc.) | | | Automated capacity monitoring and App area's ability to articulate capacity usage, (storage, cpu, mem, trans times) | | | App local recoverability capability (H/A - active/active, active/passive) - Runbook Doc current | | | App area's ability to articulate B/U job names, success rate, which App components are B/U. Also, B/U restore testing | | |
| 4 | L1 (H/W) Target(s) | O/S & H/W Drivers | Yes | 3 | Server(CPU, Mem, Disk) | Yes | 3 | Server(CPU, Mem, Disk) | Yes | 3 | Multiple servers allowing for continued avail with failure of individual node | Yes | 3 | Server O/S B/U occurring- success rate | Yes | 3 |
| 5 | L2 (Middleware) Target(s) | Middleware configs-Cluster configs across dependant nodes, etc. | Yes | 3 | App port - DB listener/port | No | 0 | App process CPU, Mem - DB SGA - SAN/NAS | No | 0 | Multiple App instances allowing for continued avail with failure of individual nodes | Yes | 3 | Application & DB middleware B/U, log files, etc, success rate | No | 0 |
| 6 | L3 (Application) Target(s) | App start scripts - SQL code - App. .ini files, ct | Yes | 3 | App URL/Page - DB table access, etc. | Yes | 3 | App trans round trip time - DB avg query rate, etc. | No | 0 | Application is H/A aware - no hard coded srv names or IP(s) | Yes | 3 | App trans data, App logs,DB data,success rate | No | 0 |
| 7 | | Using A&M Program tools across L1-L3 w/end to end trans flow | | | Using A&M Program tools across L1-L3 w/end to end trans flow | | | Using A&M Program tools across L1-L3 w/end to end trans flow | Yes | 3 | Local restore procedures doc exist & current | Yes | 3 | Annually scheduled B/U resore test to non-prod env | No | 0 |

ENTERPRISE APPLICATION HIGH AVAILABILITY SCORING AND PRIORITIZATION SYSTEM

BACKGROUND

As more and more business models are modified to fit the evolving world of e-commerce, corporations are forced to utilize more and more application services to meet the demand. In addition, users and clients, e.g., insurance agents, are accessing these enterprise applications, e.g., insurance agent portal applications, through a larger variety of methods, e.g., traditional web portals, mobile application interfaces, etc. Thus, the number and complexity of enterprise application services that corporations must implement, maintain, and manage has ballooned in recent years.

The availability of these enterprise applications to users is extremely crucial in many enterprises. In order to maintain a constant online presence companies invest in robust and redundant hardware and software systems. Enterprises strive to create what are known as fault tolerant systems. A fault tolerant system is one capable of sustaining an unplanned event without disrupting the enterprise application's end user. This requires avoiding single points of failure through built in redundancies for the enterprise application, e.g., multiple independent sources, and multiple independent diversely-routed distribution paths, etc.

However, all enterprise applications are still susceptible to failure, particularly if not monitored and updated correctly and continuously. Enterprise applications can become overloaded or lose their redundancy, e.g., through failure of a single independent node within the system. By way of example, even in a redundant system, e.g., where two redundant nodes perform the same function, when a single node in a redundant system fails, this failure might go unnoticed if the system is not properly monitored.

Therefore, there is a need for an overall management, update, and repair systems implementing enterprise application. This introduces a problem for enterprises with large portfolios of enterprise applications. Even if an enterprise wishes to continuously or routinely monitor its enterprise applications, the volume of enterprise applications often creates an issue for properly allocating limited technical resources to appropriately monitor and remediate critical or important enterprise applications.

BRIEF SUMMARY

In summary, an embodiment provides a system for prioritizing maintenance of a portfolio of insurance enterprise applications, comprising: a database storing risk scoring data of the portfolio of insurance enterprise applications; a processor that accesses a risk score from the database for a plurality of the insurance enterprise applications; the processor prioritizing, based on the risk scoring data, a subset of the insurance enterprise applications that has a highest risk for failure from the plurality for availability analysis; the processor accessing availability data stored in a database relating to technical readiness and operational maturity scores; the processor calculating an availability score for each of the insurance enterprise applications in the subset, wherein the availability score for at least one insurance enterprise application included in the subset of insurance enterprise application reflects availability of an agent portal application to an insurance agent; the processor comparing each of the insurance enterprise applications in the subset to a corresponding predetermined benchmark using an availability score for each of the insurance enterprise applications in the subset; and an output device that outputs an indication comparing each of the insurance enterprise applications in the subset to a corresponding predetermined benchmark.

An additional embodiment provides a system for prioritizing maintenance of a portfolio of enterprise applications, comprising: a database storing risk scoring data a the portfolio of enterprise applications; a processor that accesses a risk score from the database for a plurality of the enterprise applications; the processor prioritizing, based on the risk scoring data, a subset of the enterprise applications from the plurality for availability analysis; the processor accessing availability data stored in the database relating to technical readiness and operational maturity scores; the processor calculating an availability score for each of the enterprise applications in the subset; the processor comparing each of the enterprise applications in the subset to a corresponding predetermined benchmark using an availability score for each of the enterprise applications in the subset; and an output device that outputs an indication comparing each of the enterprise applications in the subset to a corresponding predetermined benchmark.

A further embodiment provides a computerized method for prioritizing maintenance of a portfolio of enterprise applications, comprising: storing, in a database, risk data scoring a portfolio of enterprise applications; accessing, using a processor, a risk score from the database for a plurality of the enterprise applications; prioritizing, using the processor, based on the risk scoring data, a subset of the enterprise applications from the plurality for availability analysis; accessing, using the processor, availability data stored in the database relating to technical readiness and operational maturity scores; calculating, using the processor, availability score for each of the enterprise applications in the subset; comparing, the processor, each of the enterprise application in the subset to a corresponding predetermined benchmark using an availability score for each of the enterprise applications in the subset; and outputting, using an output device, an indication comparing each of the enterprise applications in the subset to a corresponding predetermined benchmark.

Additional embodiments are described, including other methods, as well as devices/apparatuses, systems including multiple devices, and products.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2 illustrates an example of availability scoring.

FIG. 3 illustrates an example design of an enterprise application.

FIG. 4 illustrates an example of technical readiness scoring methodology for an enterprise application.

FIG. 5 illustrates an example of operation maturity scoring methodology for an enterprise application.

DETAILED DESCRIPTION

Figure 1:
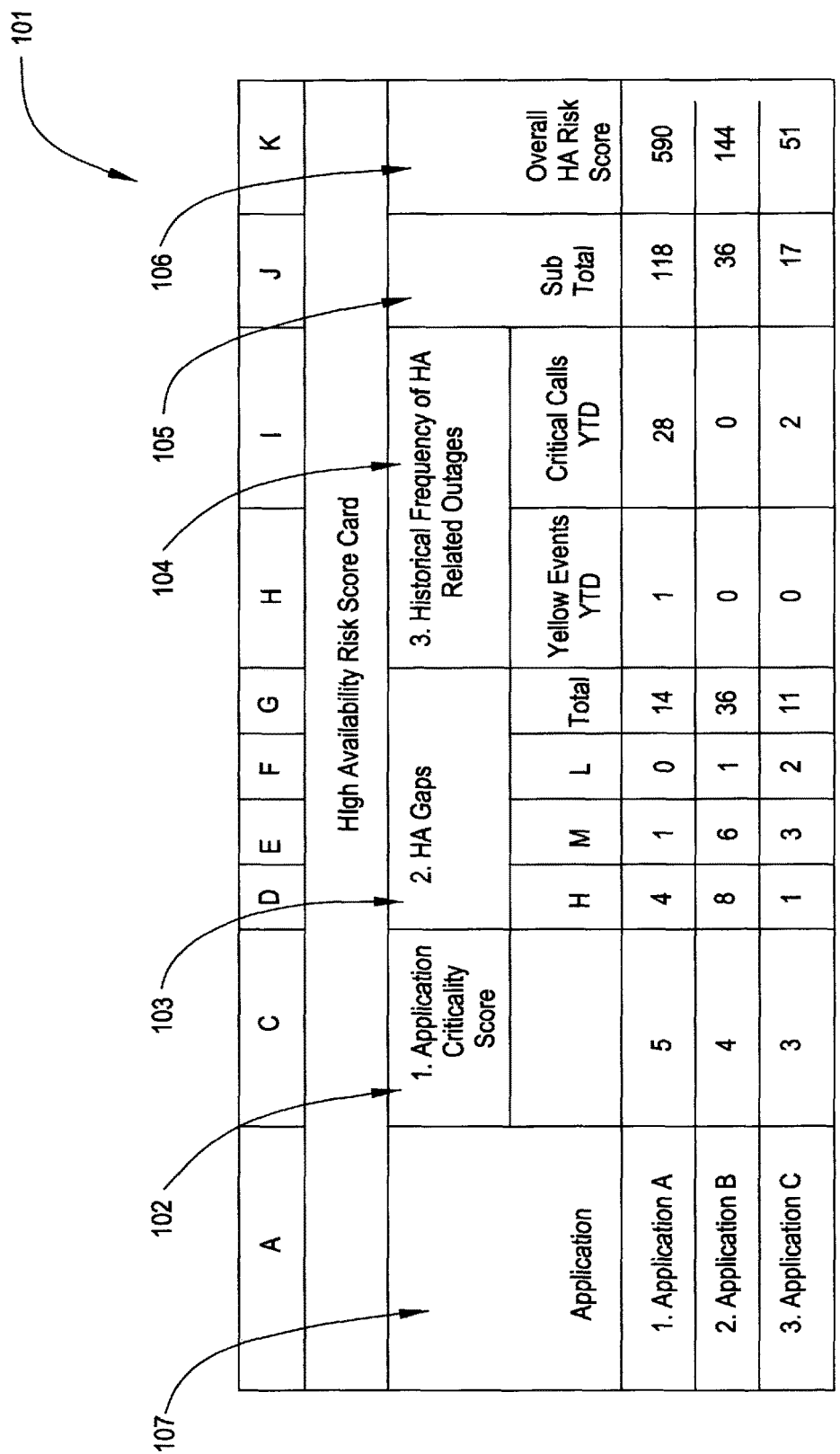
FIG. 1 illustrates an example of a high availability risk score card.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment addresses the issues large enterprises face when determining which enterprise applications in their portfolios require remediation and of those, which are the most critical. As will become more apparent in the description of example embodiments, the discussed technological improvements offered by the various embodiments are applicable to a large variety of companies that use or maintain a large portfolio of enterprise applications, e.g., Fortune 500 companies, across all vertical segments.

Although various example embodiments are described with a focus on insurance enterprise applications, e.g., an insurance agent portal application, the principles and technological improvements offered may likewise be applied to various enterprise applications, e.g., of transportation companies, manufacturing companies, etc. Thus, embodiments permit enterprises, particularly large enterprises, to improve the availability of enterprise applications in a large portfolio of enterprise applications. Embodiments may also be applied in contexts other than evaluation and remediation of enterprise applications, e.g., evaluation of top producing agencies, accessing the productivity of sales agents, assessing the effectiveness of service teams, etc.

An embodiment utilizes a data driven approach to ensure improved enterprise application availability, including platform availability. An embodiment defines a logical sequencing of events to improve an enterprise application portfolio's availability, e.g., for customers, internal users, and business partners who rely on enterprise applications or platforms to be available and fully functional. When repeated on a consistent recurring basis (e.g., monthly, quarterly, or annually), techniques enabled by embodiments drive improved outcomes, e.g., tailored to a firm's uniquely defined scoring criteria.

Accordingly, an embodiment provides a prioritizing system for the management of required maintenance to a portfolio of insurance enterprise applications. The process involves the establishment of a risk score for each known enterprise application. The enterprise applications are then sorted according to the risk score from most at risk to least at risk and a plurality of enterprise applications (e.g., a subset, where the subset consists of a predetermined number of applications) are selected for deeper analysis. In an embodiment, a further analysis of the subset of enterprise applications involves an availability analysis.

By way of example, an availability analysis includes determination of a technical readiness value and an operational maturity value for an enterprise application. The plurality of selected enterprise applications are scored based on the technical readiness and operational maturity, and then compared to a corresponding predetermined benchmark. An embodiment then determines if a selected enterprise application passed or failed the comparison and outputs an indication indicating the outcome of the evaluation.

Embodiments represent a significant technical improvement to enterprise application management and remediation technology. An embodiment is directed to substantially more than merely a computer implementation of a routine or conventional activity previously known in the industry as it significantly advances the technical efficiency, access and/or accuracy of identifying high value enterprise applications from a diverse portfolio by implementing a specific new method and system as defined herein.

An embodiment provides a specific advancement in the area of enterprise application management and remediation technology for large companies, e.g., a large insurance company, by providing technical benefits in data accuracy, data availability and data integrity and such advances are not merely a longstanding commercial practice. The embodiments provide improvement beyond a mere generic computer implementation as they involve the processing and conversion of significant amounts of data in a new beneficial manner as well as the interaction of a variety of specialized insurance, client and/or vendor systems, networks and subsystems.

For example, an embodiment facilitates the efficient identification of a sub-set of enterprise application from a large portfolio of such enterprise applications, where many of the enterprise applications may be improved, e.g., by implementing various remediation steps. By offering such an analysis, termed herein as a risk score, each enterprise application in a large portfolio may be efficiently organized based on its existing qualities as well as its relative importance to the business. Once identified, an embodiment offers a further technological improvement in that the sub-set of enterprise applications may be further evaluated, termed herein a high availability scoring methodology, such that appropriate remediation for the given enterprise application may be readily identified.

Furthermore, embodiments facilitate remediation implementation and testing, e.g., by re-evaluating enterprise applications post remediation, such that confirmation or validation of the remediation may be had, as well as continued monitoring and scoring. Thus, embodiments provide the technology necessary to automate the repeated (e.g., continuous, periodic) evaluation of the enterprise portfolio, such that limited resources (e.g., IT professionals, capital expenses, operational expenses etc.) may be more appropriately allocated.

The illustrated example embodiments will be best understood by reference to the figures. The following description is intended only by way of example, and simply illustrates certain example embodiments.

Referring to FIG. 1, an embodiment provides a system for prioritizing the maintenance needs of a portfolio of enterprise applications related to an insurance company. Typically, a corporation will maintain a database containing all of their enterprise applications. Additionally, corporations keep records on the infrastructure supporting those enterprise applications, e.g., system redundancy, concurrent maintainability, site infrastructure, software patches, and monitoring capabilities. An embodiment may analyze this data to generate risk data pertaining to the portfolio of insurance enterprise applications.

As shown in FIG. 1, an embodiment produces an availability risk scorecard 101. In this non-limiting example, a risk scorecard 101 is created based on the aforementioned risk data, e.g., for each of a plurality of insurance enterprise applications. The risk scorecard 101 may, as illustrated, include three defined categories. The categories may include data that relates to an enterprise application's risk, e.g., an application criticality category 102, a high availability gaps category 103, and an historical frequency and severity of outages category 104.

Depending on the implementation, e.g., for other enterprise applications, additional or alternative categories representing a variety of different factors may be included to better access the current state of the enterprise application or service level for all components, both hardware and software, that are involved in the end-to-end business transaction processing. Moreover, the additional or alternative factors can help to access the impact of any improvements, e.g., in the Service Level Agreements (SLA) for business weighed against the effort and cost involved in the improvements. Further considerations may include customer satisfaction improvements, opportunities for net promoter score improvements, current revenue, potential for increased revenue, new customer acquisition, improved renewal retention, etc.

As a non-limiting example, in order to determine the enterprise application criticality score, an embodiment may take into account user input (e.g., application owners weigh which enterprise applications have the largest impact on strategic business needs) to assess the criticality or importance of an enterprise application. For example, a particular user or business might place great weight or importance on agents being able to carry out their required procedures using the enterprise application without delay. As another example, the impacts on business partners, any customer interactions, and impacts on other enterprise applications might be considered critical or important by a user. Overall, the criticality score, e.g., 5 for Application A, of FIG. 1 represents how important a specific enterprise application is to the health and growth of the company's assets.

In an embodiment, a user may directly input an application criticality score, e.g., based on a numerical scale (such as 1-10). In an embodiment, the criticality score may be calculated using a variety of factors, such as application type, business type, usage history, or like factors that represent an enterprise application's importance. Furthermore, an embodiment may use both user input values (e.g., base scores, application category values, weighting values, etc.) as well as system derived or generated values, e.g., based an automated assessment of a particular enterprise application, to determine an application criticality score and included in the application criticality category 102 of the risk scorecard 101.

The high availability gaps category 103 includes values for high availability gaps. High availability gaps are typically determined by information technology (IT) professionals who compare the existing infrastructure and ecosystem of a specific enterprise application to an infrastructure or ecosystem that would be considered ideal or recommended for an enterprise application, e.g., based on the criticality of the application to business development. The standards for identifying a high availability gap may be specific to each individual business, but generally industry wide standards exist and can be referenced in determining the corporation's infrastructure standards. For example, standards regarding high availability are available from the Information Technology Infrastructure Library (ITIL), the Uptime Institute, and the InterNational Committee for Information Technology Standards (INCITS), as well as other groups. By way of example, an IT professional may then determine where and how many shortfalls the enterprise application has in comparison the ideal and records those as gaps. Moreover, the gaps may be categorized into multiple sub-classes.

In an embodiment, the high availably gaps listed in category 103 are categorized into three sub-classes: high gaps (H), medium gaps (M), or low gaps (L). The sub-classes may depend on the criticality encountered or perceived, e.g., importance of the missing infrastructure. For example, the most critical missing infrastructure might be placed in the high gap category (H), whereas the next most critical infrastructure might be placed in the medium gap category (M), and so on. This allows a weighting factor, e.g., 3 for high, 2 for medium, and 1 for low, may be applied to the different categories of gap values. Thus, the more critical gaps will factor more heavily into the overall risk score category 106 including overall risk scores for the enterprise applications (e.g., Application A through Application C in FIG. 1). The overall risk score, as further described herein, may be used selecting a sub-set of enterprise applications for further analysis, remediation and testing, as further described herein.

Another category 104 included in the risk score card 101 that may be used in calculating an overall risk score (also referred to herein as an overall HA risk score) is the historical frequency of high availability related outages, listed in category 104. A non-limiting example of the historical frequency would be a record of all the year to date outages, or all the recorded outages from a predetermined time period, for a particular enterprise application. The period may be selected from a time frame no earlier than the most recent enterprise application added to the portfolio, however, to avoid a skewing of the data. Additionally, the outages may be broken up into multiple sub-categories to allow for weighting.

One such sub-category might be critical calls, meaning where an enterprise application was critically down during a required operation period. These critical call events potentially lead to lost revenue, loss of customer base, or loss of other desirable business assets. Additionally, yellow events might form a sub-category, e.g., where a cascading failure of multiple systems caused by the failure of a single enterprise application. This can lead to the critical failure of other operational enterprise applications due to overburdening or application dependency. Due to the extreme negative effects that can be caused by a yellow event, it might be weighted extremely heavily in comparison to a less severe critical call.

In an embodiment, the overall risk score allows for the prioritization of the enterprise applications. This prioritization is offered to provide a novel view of the improvement opportunities within the portfolio, e.g., which enterprise application improvement(s) best align to the particular firm's goals. This helps ensure an effective return on investment and generates better outcomes based on a pre-defined data driven approach to identifying enterprise applications within a large portfolio. Often times large complex enterprise portfolios have many high availability improvement opportunities. The portfolio prioritization process solves the challenge of understanding where best to focus the corporation's capital, IT resources, etc., e.g., based on the characteristics of the portfolio as evaluated by a scoring model.

By way of specific example, for Application A in FIG. 1, an embodiment may calculate the application criticality score, i.e., 5 listed in category 102, by having a user provide a numerical value representing the enterprise application's relative importance to the business. The HA gaps listed in category 103, i.e., high gaps (H) 4, medium gaps (M) 1, and low gaps (L) "0" in FIG. 1 might be provided by a user inputting the shortfalls of an enterprise application with respect to a standard. The "total" gap score may be generated by an embodiment using logic such as multiplying high gaps (H) by 3, multiplying medium gaps (M) by 2, and multiplying low gaps (L) by 1, and summing the total, or for the specific example of FIG. 1:

$$H*3+M*2+L*1=14.$$

Continuing with the specific example of FIG. 1, the historical frequency of HA related outages of category 104 may be calculated referencing a database containing historical outage information. These values, e.g., yellow events YTD and critical calls YTD may be weighted by multiplying the number of critical calls by 3 and multiplying the number of yellow events by 20, or in the specific example of FIG. 1:

Yellow Events YTD*20+Critical Calls YTD*3=104

The historical frequency of HA related outages, e.g., 104 for Application A, is then summed with the total HA gaps value, e.g., 14 for Application A, giving a subtotal of 118 for Application A. This subtotal may then be weighted, e.g., by multiplication with the application criticality score, i.e., 5 for Application A, to yield an overall HA risk score, i.e., 590 for Application A.

The portfolio prioritization process defines a data driven approach that aligns with a firm's overall goals (e.g., availability of consumer portals, distribution systems, etc.). An embodiment thus solves a challenge of understanding where to best focus the company's capital based on the characteristics of the portfolio prioritization scoring model (e.g., focus on use of financial capital, available resources, e.g., IT professionals, hardware, software, etc.).

In an embodiment, prioritizing is done based on the overall risk score represented in category 106 of FIG. 1. Thus, in the example shown in FIG. 1, Application A would be the enterprise application with the highest risk based on the availability risk scorecard 101. From this prioritized list, the subset of insurance enterprise applications may selected from the portfolio for availability analysis. In an embodiment, availability analysis can refer to availability of an insurance agent portal enterprise application to an agent or representative of the insurance enterprise.

In an embodiment, once the subset of enterprise applications are selected, they are analyzed more thoroughly using a high availability score methodology. Illustrated in FIG. 2 is an example high availability scoring card 201 for a single enterprise application, e.g., one of the enterprise applications within the subset is identified via risk scoring. In the embodiment shown in FIG. 2, the availability scoring is broken down in to two sub-categories of technical readiness 202 and operational maturity 203. The data corresponding to each of these sub-categories is stored in a database and utilized in creating an availability total score 204.

By way of example, a technical readiness score may be generated to assess the architecture, engineering and technical quality of the enterprise application or platform design and implementation. In addition, a technical readiness score may be further broken down in to other set(s) or sub-classes. In the example shown in FIG. 2, technical readiness is broken down in to four sub-classes: presentation, application, database, and storage. However, the sub-classes can be modified to fit the needs of any industry or can include additional classes such as automation capabilities, capacity to support customer interaction, capacity to support customer service representatives, access to relevant information to effectively resolve customer complaints in a timely manner, infrastructure and application availability to access necessary information, recruiting process, service level training program, automation supporting service reps, or the like.

The four sub-classes shown in example embodiment of FIG. 2 are based on the industry standard for design fundamentals of a layered application, one example of which is illustrated in FIG. 3. In the enterprise application illustrated in FIG. 3, the presentation layer 301 contains the user oriented functionality responsible for managing user interaction with the system and consists of components that provide a common bridge into the core business logic encapsulated in the business layer. It may be important that this layer be robust because of the many different methods users can employ to access it, which can include for example mobile applications, client applications, and internet applications.

Referring back to FIG. 2, a presentation score of 9, e.g., on a scoring scale of 3, 6 and 9, wherein 9 is the highest score possible in the example of FIG. 2, has been given in the presentation sub-class. This presentation value can be weighted, e.g., individually depending on business needs.

The second sub-class shown in FIG. 2, and corresponding to application layer 302 of FIG. 3, is application. The application layer 302 is where the business logic is held. The application layer 302 is concerned with the retrieval, processing, transformation, and management of application data. It also deals with business rules and polices, e.g., restricting agents to the ability to retrieve only quotes based on their location, or restricting consumers from accessing more complex calculations regarding insurance rates or quotes. In FIG. 2 an application score of 9, e.g., the highest possible score in this example, has been given in the application sub-class for this particular enterprise application. This application value can be weighted, e.g., individually depending on business needs.

The next sub-class shown in FIG. 2, and corresponding to database layer 303 of FIG. 3, is database. The database layer 303 provides access to data hosted within the boundaries of the system, and data exposed by other networked systems. The database layer 303 is composed of generic interfaces that the components in the application layer 302 can consume, which can be evaluated in numerous ways. In FIG. 2 a database score of 6, e.g., the median score in this example, has been given in the database sub-class. This database value can be weighted, e.g., individually depending on business needs.

The final sub-class shown in FIG. 2, and corresponding to storage layer 304 of FIG. 3, is storage. The storage layer 304 deals with the actual physical arrangement of the devices that store every prior layer. The evaluation system for the storage layer will be based on the type of storage, e.g., Direct Attached Storage (DAS), Network Attached Storage (NAS), or Storage Area Networks (SAN). Additionally, it could consider the type of architectures used in the system, e.g., clustered architectures, tightly coupled (scaled out architectures), loosely coupled (scaled out architectures), or distributed (shared nothing architectures). FIG. 2 shows a storage score of 9, e.g., the highest possible score in this example, has been given in the storage sub-class. This value can be weighted, e.g., individually depending on business needs.

All of the above sub-classes can be evaluated by a custom value range and by custom characteristics. A non-limiting example is shown in FIG. 4 where the all of the sub-classes are shown. In the embodiment shown in FIG. 4, the presentation layer is capable of three separate scores, 3, 6, and 9. Each of these scores corresponds to a predetermined description, as shown in FIG. 4. This allows for evaluation and scoring of the enterprise application, e.g., presentation, to be data driven, thus an equal evaluation can be maintained across the board.

Referring to FIG. 4, the presentation layer deals with the applications presentation tier, e.g., IIS, SUNONE, APACHE, etc. By way of example, the presentation description "Single server with single instance" corresponds to a non-redundant presentation layer design, e.g., including only one server and one network interface card. If a system was determined to be at this level or a predetermined equivalent, the results would be the lowest possible score of 3 (again using a 3, 6, 9 scoring system). This may be contrasted to the description of a redundant presentation layer, e.g., having a score of 9 in FIG. 4 and described as "Multiple instances across multiple servers in active/active load balanced or clustered mode." Alternative scoring methods are also possible (as further described in association with FIG. 5).

Additionally, in FIG. 4, the application layer deals with the tier hosting the application, e.g., .IIS, WEBLOGIC, TOMCAT, ORACLE FORMS, etc. By way of example, the application description "Single instance running on a single server" corresponds to a non-redundant application layer, e.g., there is only one operational version of the application and that version is only operational on a single server. If a system was determined to be at this level or a predetermined equivalent, the results would be the lowest possible score of 3 (again using a 3, 6, 9 scoring system). This may be contrasted to the description of a redundant application layer, e.g., having a score of 9 in FIG. 4 and described as "Multiple instances across multiple servers in active/active load balanced or clustered mode."

Further, in FIG. 4, the database layer deals with the application database tier, e.g., SQL, ORACLE, DB2, etc. By way of example, the database description "Single instance running on a single server" corresponds to a non-redundant database layer, e.g., there is only one version of the database in existence, and it is only accessible via a single server. If the system was determined to be at this level or a predetermined equivalent, the results would be the lowest possible score of 3 (again using a 3, 6, 9 scoring system). This may be contrasted to the description of a redundant database layer, e.g., having a score of 9 in FIG. 4 and described as "Multiple instances across multiple servers in active/active load balanced or clustered mode."

Even further, in FIG. 4, the storage layer deals with application data storage, e.g., NAS, SAN, local DASD, etc. By way of example, the storage description "Server local DASD RAID Config" corresponds to a non-redundant storage layer, e.g., there is no off site backup of the data and the data is only stored on a single medium. If the system was determined to be at this level or a predetermined equivalent, the results would be the lowest possible score of 3 (again using a 3, 6, 9 scoring system). This may be contrasted to the description of a redundant storage layer, e.g., having a score of 9 in FIG. 4 and described as "NAS and/or SAN qtree auto fail—diverse fabric, zones redundant path—App access storage via alias."

In an embodiment, the operational maturity score category 203 for operation maturity scoring lists scores on a scale of 3, 6, 9 and 12, where 12 is the score assigned to the most operationally mature enterprise applications. The operational maturity score reflects the maturity of the enterprise application, e.g., maturity of the team supporting the enterprise application or platform, the time in service for the enterprise application, etc. The operational maturity scoring also may be broken down in to other set(s) or sub-classes.

In the example shown in FIG. 2, operational maturity is broken down into five sub-classes: configuration scan, monitoring, capacity, restore documentation, and data backup/restore. However, the sub-classes can be modified to fit the needs of any industry or can include additional classes such as: functionality testing, resilience, recoverability, scalability, supportability, securability, limitations, integrity, SLA scope, effectiveness of service support team, percent of staff trained, or composition of support team, frequency of customer contact, etc.

The five sub-classes shown in example embodiment of FIG. 2 are based on the unique needs of each industry or even unique to each business strategy. The configuration scan sub-class for example is a process for ensuring that a plurality of enterprise applications that share a common nucleus also all share common configuration schemes. The configuration scan analyzes the configuration files for each individual enterprise application, and checks for discrepancies. Thereby allowing a faulty configuration file to be flagged and addressed accordingly. This process prevents a catastrophic failure of a group of similar enterprise applications due to the failure of a single enterprise application, i.e., a "yellow event," due to a configuration error. In FIG. 2 a configuration scan score of 6 has been given to the example enterprise application in the configuration scan sub-class, representing an intermediate scoring value. This value can be weighted, e.g., individually depending on business needs.

The second sub-class shown in FIG. 2 in operational maturity is a monitor sub-class. The monitor characteristic relates to watching the overall system for failures of any type. Monitoring is employed for a variety of reasons. In a mission critical facility, for example, the operational support staff must be alerted immediately if someone breaks into the computer room, if upstream services disappear, and if a process or application fails for any reason. This monitoring sub-class may be scored objectively against an ideal standard to ensure the data driven analysis is uniform. FIG. 2 shows a monitoring score of 9 for this example enterprise application. This value can be weighted, e.g., individually depending on business needs.

The next sub-class shown in FIG. 2 is capacity. The capacity score relates not only to the existing capacity of storage in a particular system, but also the knowledge of the capacity in that system. System administrators for example may desire to scale up the disk space for a storage service or scale up the bandwidth for a data streaming service. In addition, they may wish to scale down a system's available resources, and reallocate them, if that system is reaching end of life or is no longer being utilized. Knowledge is a key to ensuring the existing capacity of the system is properly scoped to a corporation's capacity needs. FIG. 2 shows a capacity score of 6 in the capacity sub-class. This value can be weighted, e.g., individually depending on business needs.

The next sub-class shown in FIG. 2 is restore documentation. The restoration documentation score evaluates whether adequate instructions exist to restore a critical system after any type of failure. Every application/system should have documentation that enables any IT professional, no matter their experience with the enterprise application, to reboot/restore the application regardless of reason for fault. The restoration documentation should include but is not limited to the procedure to restore the enterprise application, the location of the backup data files, the business group or third party that owns or uses the enterprise application, and any specialized configuration settings. In FIG. 2 a restoration documentation score of 12 has been assigned to the example enterprise application, the highest possible score in operations maturity. This value can be weighted, e.g., individually depending on business needs.

The final sub-class shown in FIG. 2 is data backup/rest (data backup/restore). The data backup/rest score evaluates whether adequate backup systems are in place to ensure no data is lost in the event of failure. An enterprise application failure can result form something as simple as a loss of connection, but can also be caused by something as severe as a fire consuming the whole data center. One again the scores may be predetermined and the rankings data driven to ensure equality in the assessment of each individual enterprise application. In FIG. 2 a data backup/rest score of 3 has been given in the data backup/rest sub-class. This value can be weighted individually, e.g., depending on business needs.

The values shown in 201 are data driven values, however, an in an embodiment the values can be weighted depending on a predetermined criteria. By way of specific example, the technical readiness 202 scores may be weighted higher than the operational maturity 203 scores, i.e. the gaps in the technical readiness scores have a higher probably of causing an enterprise application outage. By way of further example and as shown in FIG. 2, the "Sub-Total" score for the technical readiness portion score may be generated by an embodiment using logic such as multiplying the values in each category, e.g., presentation, application, database, and storage multiplied by 4, and summing the total, or for the specific example of FIG. 2:

$$9*4+9*4+6*4+9*4=132.$$

Continuing with the specific example of FIG. 2, the five data points categorized under operational maturity may be weighted amongst themselves, i.e., have differing weighting values. By way of further example and as shown in FIG. 2, the "Sub-Total" score for the operational maturity portion may be generated by an embodiment using logic such as multiplying the values in each category, e.g., configuration scan, monitor, capacity, H/A restore documentation, and data backup/restore, and summing the total, or for the specific example of FIG. 2:

$$6*1+9*3+6*3+12*1+3*2=69.$$

The "Sub-Total" from each category, e.g., technical readiness and operational maturity, is then summed into a total, e.g., 201 for the shown enterprise application, being displayed as the "Availability Total." In an embodiment, this "Availability Total" score is then compared against a corresponding predetermined benchmark e.g., a predetermined value range within which the score should be for each enterprise application.

The portfolio prioritization process defines a data driven approach that aligns with a firm's overall goals (e.g., availability of consumer portals, distribution systems, etc.). An embodiment thus solves the challenge of understanding where to best focus the company's capital based on the characteristics of the portfolio prioritization scoring model (e.g., focus on use of financial capital, available resources, e.g., IT professionals, hardware, software, etc.).

By way of example, in FIG. 5 the configuration scan description "no monitoring" corresponds to a non-monitored enterprise application. Thus, this results in a lowest possible score of 3 (again using a 3, 6, 9, 12 scoring system). This may be contrasted with the rest of the listings, which include at least some configuration scanning capabilities, and thus have higher scores.

All of the above sub-classes can be evaluated by a custom value range and by custom characteristics. A non-limiting example is shown in FIG. 5 where all of the categories are shown. In the embodiment as shown in FIG. 5, the configuration scan category is capable of four separate scores, 3, 6, 9, and 12. Each of these scores corresponds to a characteristic meeting a list of predetermined qualifiers, as shown in FIG. 5. This allows for evaluation and scoring of the enterprise application, e.g., configuration. scan, to be data driven, thus an unbiased evaluation can be maintained across the board. This scoring method differs from the technical readiness scoring system in that categories are not mutually exclusive, e.g., the monitoring category can receive a score of three in each sub-category, thus achieving a total score of 12. The more sub-categories of each category that the application meets the higher the total score will be.

In FIG. 5, the configuration scan deals with blade logic and/or BMC ADDM tools implemented to scan for configuration file consistence across dependant nodes. By way of example, the configuration scan description "O/S & H/W Drivers" corresponds to configuration scan design for the hardware and supporting software, e.g., only scanning for O/S types and hardware drivers. If a system was determined to satisfy this requirement fully, it would be awarded a 3. This may be contrasted to the configuration scan description "App start scripts—SQL code—App .ini files, ct" which corresponds to a configuration scan for the application start scripts. If an application where to fail every sub-category, it would receive the lowest possible score of 0. Alternative scoring methods are also possible (as further described above in association with FIG. 4).

Additionally, in FIG. 5, the monitoring category deals with the availability of automated monitoring via toll integration, e.g., BMC, SITESCOPE, GRID, i3, etc. By way of example, the monitoring description "Server (CPU, Mem, Disk)" corresponds to a monitoring system design for monitoring the hardware components of the application, e.g., the monitoring capability are limited to server hardware like system memory. If a system was determined to satisfy this requirement fully, it would be awarded a 3. This may be contrasted to the monitoring description "Using A&M Program tools across L1-L3 w/end to end trans flow" which corresponds to monitoring the end to end transmission of data for the application. If an application where to fail every sub-category, it would receive the lowest possible score of 0.

Further, in FIG. 5, the capacity category deals with the capacity of automated monitoring and the application area's ability to articulate capacity usage e.g., storage, CPU, memory, transmission times, etc. By way of example, the capacity description "Server (CPU, Mem, Disk) Single instance running on a single server" corresponds to a capacity system design for the hardware components of the application, e.g., the capacity capability are limited to server hardware like system memory. If a system was determined to satisfy this requirement fully, it would be awarded a 3. This may be contrasted the capacity description "Using A&M Program tools across L1-L3 w/end to end trans flow" which corresponds to the capacity of the end to end transmission of data for the application. If an application where to fail every sub-category, it would receive the lowest possible score of 0.

Even further, in FIG. 5, the restore/documentation category deals with an application's local recoverability capability, e.g., H/A—active/active, active/passive, and if the runbook documentation is current. By way of example, the restore/documentation description "Multiple servers allowing for continued avail with failure of individuals nodes" corresponds to restore/documentation system where the application would continue to be available with a single node failure, e.g., where multiple servers exist allowing for the restoration of the application. If a system was determined to satisfy this requirement fully, it would be awarded a 3. This may be contrasted the restore/documentation description "Local restore procedures doc exist & current," which corresponds to the existence of properly documented restore procedures, e.g., all of the records of how to restore the application exist and are current regarding application version and hardware specifications. If an application where to fail every sub-category, it would receive the lowest possible score of 0.

Finally, in FIG. 5, the backup/restoration test category deals with an application area's ability to articulate backup job names, success rate, which application components are backed up. By way of example, the backup/restore test description "Server O/S B/U occurring—success rate" corresponds to whether proper backups of the server's operating system are taking place and determining if they are successful. If a system was determined to satisfy this requirement fully, it would be awarded a 3. This may be contrasted the backup/restore test description "Annually scheduled B/U restore test to non-prod env.," which corresponds to whether or not the backup restoration process was tested on an annual basis, e.g., attempting to restore an application in a non-production environment. If an application where to fail every sub-category, it would receive the lowest possible score of 0.

The enterprise application high availability scoring methodology, portfolio prioritization and testing process may be implemented in an automated or semi automated system using appropriate circuitry and components programmed according to the various embodiments. While various other circuits, circuitry or components may be utilized in computing devices utilized for such special purposes, an example illustrated in FIG. 6 includes a system design found for example in laptop, desktop or other computing platforms. Such circuitry 600 may be used in a device that implements a high availability scoring methodology, portfolio prioritization and testing process, as described herein, such as a computing device of an insurance carrier used for enterprise application portfolio management.

Figure 6:
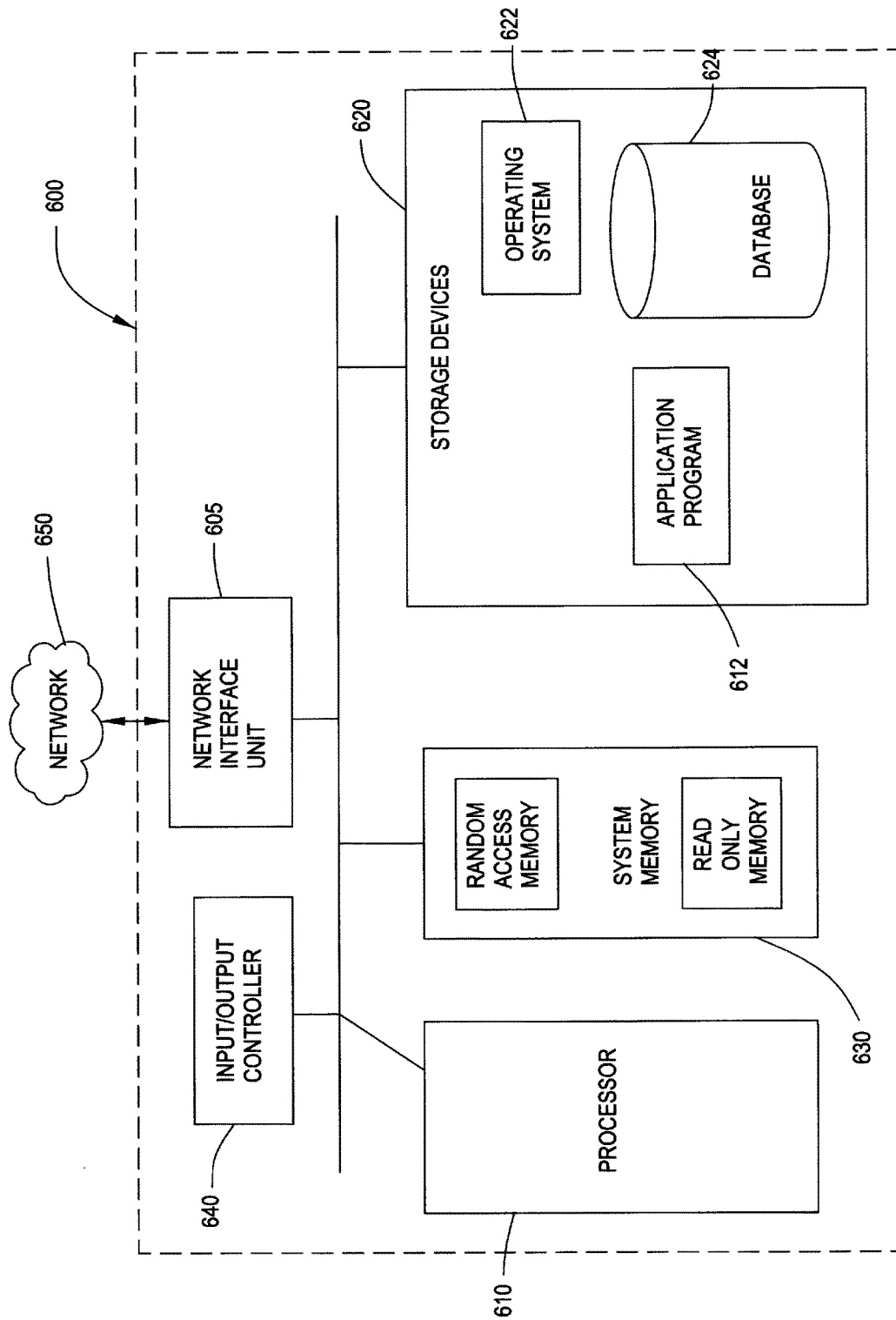
FIG. 6 illustrates an example system for evaluating enterprise application risk and availability.

In the example of FIG. 6, a storage device 620 includes software such as an enterprise application portfolio management application program 612 that may be run or executed by processor(s) 610 according to an operating system 622. The circuitry 600 provides that the processor loads the operating system 622 and thereafter the application program 610, e.g., into memory 630.

System 600 typically includes a network interface 605 facilitating communications with other devices, e.g., a connection to other devices over a network 650 using components such as a WWAN transceiver, a WLAN transceiver or a wired connection, e.g., a LAN connection. Commonly, system 600 will include an input/output controller 640 for data input and display. System 600 typically includes various memory 630 and storage devices 620, for example a database 624, e.g., for storing risk data and high availability data related to an insurance company's portfolio of enterprise applications, referred to herein.

Device circuitry, as for example outlined in FIG. 6, may be by insurance carriers to execute portfolio management software. It will also be apparent that circuitry other than the non-limiting example outlined in FIG. 6 may be used.

In an embodiment, circuitry such as outlined in FIG. 6 may be used to implement remediation of enterprise applications and testing thereof. Thereafter, an embodiment may continue to monitor the enterprise applications, e.g., in real time.

Figure 7:
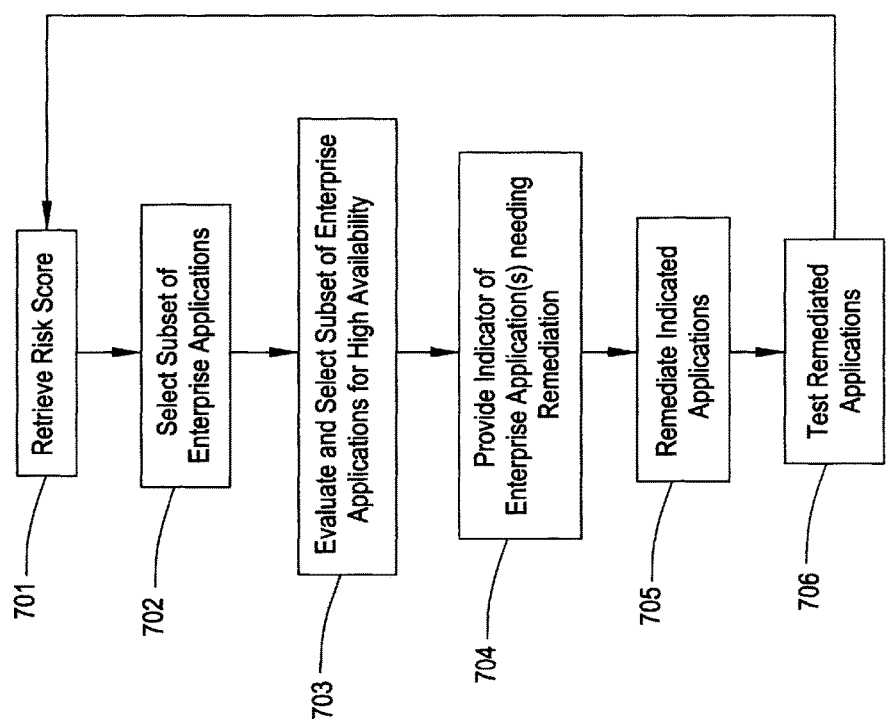
FIG. 7 illustrates an example method of evaluating, remediating and testing of enterprise applications.

By way of example, FIG. 7 illustrates an example method of evaluating, remediating and testing of enterprise applications. In a first step at 701 an embodiment retrieves risk scores for enterprise applications, e.g., such as stored in a database 624. Next, at 702 an embodiment conducts a risk analysis, e.g., as outlined in connection with FIG. 1 to prioritize the subset of enterprise applications with respect to risk. As has been described herein, the calculation of risk scores may be modified or designed to suit particular business needs. Also, the subset of enterprise applications may be modified, i.e., the number of applications selected for the subset may be customized.

Having selected a subset of enterprise applications, an embodiment evaluates these enterprise applications at 704 to calculate their availability. This may include the provisioning of an indicator of those enterprise applications that either meets a predetermined standard, e.g., gold, silver or bronze, or those enterprise applications that fail to meet a predetermined standard, e.g., those in need of remediation.

An embodiment at 705 may implement appropriate remediation, e.g., installation of additional supporting hardware, patches or fixes to software, updating of enterprise applications, etc. Once remediation has been implemented for the indicated enterprise applications, an embodiment may test these to ensure the remediation implemented has addressed the faults or flaws associated with the insufficient risk score and/or availability score. Thereafter, the remediated enterprise applications are counted in the portfolio of enterprise applications, i.e., they are monitored along with the other enterprise applications.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A computer system for prioritizing maintenance and at least one of patching and updating of a portfolio of enterprise applications, comprising:
    a processor that accesses a database within a database layer of a layered enterprise application, wherein the database stores a portfolio identifying a plurality of enterprise applications and records related to infrastructure supporting each of the plurality of enterprise applications;
    generating and storing in a database within the database layer, risk scoring data for each of the enterprise applications, wherein the risk scoring data is generated using the records related to the infrastructure supporting the application and comprises criticality data, availability gap data, and historical outage data;
    a processor that generates for display on and communication to a client device through a presentation layer of the layered enterprise application, a risk scorecard comprising generating an overall risk score based on the criticality data, availability gap data, and historical outage data for each of a plurality of the enterprise applications, wherein the presentation layer allows access to the layered application by a plurality of users employing one or more access methods selected from the group consisting of: mobile applications, client applications, and internet applications and wherein the presentation layer provides a bridge between the plurality of users and the application layer of the layered enterprise application;
    the generating an overall risk score comprising:
        the processor capturing input, from a user via the presentation layer, related to criticality data of the enterprise application, the criticality data identifying an importance of the enterprise application to the enterprise;
        the processor calculating, within the application layer, an availability score, using the availability gap data stored in the database and relating to technical readiness and operational maturity scores, for each of the enterprise applications, wherein the availability score for at least one enterprise application reflects availability of an agent portal application to an insurance agent; and
        the processor determining, within the application layer, a historical frequency for availability related outages, wherein the historical frequency identifies a number and frequency of outages resulting in a failure of one or more systems of the infrastructure of the enterprise application as identified from the database layer;
    the processor prioritizing within the application layer, for availability analysis and based on the generated overall risk score, a subset of the enterprise applications that has a highest risk for failure;
    the processor comparing, within the application layer, each of the enterprise applications in the subset to a corresponding predetermined benchmark using an availability score for each of the enterprise applications in the subset;
    an output device that outputs, via the presentation layer, an indication comparing each of the enterprise applications in the subset to a corresponding predetermined benchmark, wherein the indication comprises a prioritization of each of the enterprise applications in the subset as compared with the other enterprise applications in the subset and wherein the prioritization identifies at least one of the enterprise applications as a high priority based upon at least one goal of the enterprise and wherein the prioritization identifies an application to maintain to prevent unavailability of the at least one high priority enterprise application;
    responsive to the identification of the application as to be maintained, the processor implementing at least one of patching and updating of the application identified as to be maintained to prevent unavailability of the at least one high priority application; and the processor testing the at least one of patched and updated application to ensure the at least one of a patch and an update implemented has addressed a fault or flaw associated with the identification of the application as to be maintained.

2. The system of claim 1, wherein the indication comprises an indication that the enterprise applications in the subset that fall below a predetermined benchmark are selected for remedial action.

3. The system of claim 1, wherein a risk score for an enterprise application comprises at least one value selected from the group consisting of a criticality score, a gaps score, and a historical outages score; wherein the at least one factor is weighted.

4. The system of claim 1, wherein technical readiness of an enterprise application comprises at least one value selected from the group consisting of presentation layer score, an application layer score, a database layer score, and a storage layer score; wherein the at least one value is weighted.

5. The system of claim 1, wherein operational maturity of an enterprise application comprises at least one value selected from the group consisting of a configuration scan score, a monitoring score, a capacity score, a documentation score, and a data backup score; wherein the at least one value is weighted.

6. A system for prioritizing maintenance and implementing remediation of a portfolio of enterprise applications, comprising:
a processor that accesses a database within a database layer of a layered enterprise application, wherein the database stores a portfolio identifying a plurality of insurance enterprise applications and records related to infrastructure supporting each of the plurality of enterprise applications;
generating and storing in a database within the database layer, risk scoring data of the portfolio of enterprise applications, wherein the risk scoring data comprises criticality data, availability gap data, and historical outages data for each of the enterprise applications of the portfolio;
a processor that generates for display on and communication to a client device through a presentation layer of the layered enterprise application, a risk scorecard comprising generating an overall risk score based on the criticality data, availability gap data, and historical outage data for each of a plurality of the enterprise applications, wherein the presentation layer allows access to the layered application by a plurality of users employing one or more access methods selected from the group consisting of: mobile applications, client applications, and internet applications and wherein the presentation layer provides a bridge between the plurality of users and the application layer of the layered enterprise application;
the generating an overall risk score comprising:
the processor capturing input, from a user via the presentation layer, related to criticality data of the enterprise application, the criticality data identifying an importance of the enterprise application to the enterprise;
the processor calculating, within the application layer, an availability score, using the availability gap data stored in the database, for each of the enterprise applications in the subset; and
the processor determining, within the application layer, a historical frequency for availability related outages, wherein the historical frequency identifies a number and frequency of outages resulting in a failure of one or more systems of the infrastructure of the enterprise application as identified from the database layer;
the processor prioritizing within the application layer, for availability analysis and based on the generated overall risk score, a subset of the enterprise applications that has a highest risk for failure;
the processor comparing, within the application layer, each of the enterprise applications in the subset to a corresponding predetermined benchmark using an availability score for each of the enterprise applications in the subset;
an output device that outputs, via the presentation layer, an indication comparing each of the enterprise applications in the subset to a corresponding predetermined benchmark, wherein the indication comprises a prioritization of each of the enterprise applications in the subset as compared with the other insurance enterprise applications in the subset and wherein the prioritization identifies at least one of the enterprise applications as a high priority based upon at least one goal of the enterprise and wherein the prioritization identifies an application to maintain to prevent unavailability of the at least one high priority enterprise application;
responsive to the identification of the application as to be maintained, the processor implementing at least one of patching and updating of the application identified as to be maintained to prevent unavailability of the at least one high priority application; and
the processor testing the at least one of patched and updated application to ensure the at least one of a patch and an update implemented has addressed a fault or flaw associated with the identification of the application as to be maintained.

7. The system of claim 6, wherein the indication comprises an indication that the enterprise applications in the subset that fall below a predetermined benchmark are selected for remedial action.

8. The system of claim 6, wherein the testing is done in real time.

9. The system of claim 6, wherein a risk score for an enterprise application comprises at least one value selected from the group consisting of a criticality score, a gaps score, and a historical outages score; wherein the at least one factor is weighted.

10. The system of claim 6, wherein technical readiness of an enterprise application comprises at least one value selected from the group consisting of presentation layer score, an application layer score, a database layer score, and a storage layer score; wherein the at least one value is weighted.

11. The system of claim 6, wherein operational maturity of an enterprise application comprises at least one value selected from the group consisting of a configuration scan score, a monitoring score, a capacity score, a documentation score, and a data backup score; wherein the at least one value is weighted.

12. A computerized method for prioritizing maintenance and at least one of patching and updating of a portfolio of enterprise applications, comprising:
accessing a database within a database layer of a layered enterprise application, wherein the database stores a portfolio identifying a plurality of enterprise applications and the database storing records related to infrastructure supporting each of the plurality of enterprise applications;

generating and storing, in a database within the database layer, risk scoring data for each of a portfolio of enterprise applications, wherein the risk scoring data is generated using the records related to the infrastructure supporting the application and comprises criticality data, availability gap data, and historical outages data;

generating, using a processor for display on and communication to a client device through a presentation layer of the layered enterprise application, a risk scorecard comprising generating an overall risk score based on the criticality data, availability gap data, and historical outage data for each of a plurality of the enterprise applications, wherein the presentation layer allows access to the layered application by a plurality of users employing one or more access methods selected from the group consisting of: mobile applications, client applications, and internet applications and wherein the presentation layer provides a bridge between the plurality of users and the application layer of the layered enterprise application;

the generating an overall risk score comprising:
  capturing input, from a user via the presentation layer, related to criticality data of the enterprise application, the criticality data identifying an importance of the enterprise application to the enterprise;
  calculating, using the processor and within the application layer, availability score, using the availability gap data stored in the database and relating to technical readiness and operational maturity scores, for each of the enterprise applications, wherein the availability score for at least one enterprise application reflects availability of an agent portal application to an insurance agent; and
  the processor determining, within the application layer, a historical frequency for availability related outages, wherein the historical frequency identifies a number and frequency of outages resulting in a failure of one or more systems of the infrastructure of the enterprise application as identified from the database layer;

prioritizing within the application layer, for availability analysis and based on the generated overall risk score, a subset of the enterprise applications that has a highest risk for failure;

comparing, within the application layer and using the processor, each of the enterprise applications in the subset to a corresponding predetermined benchmark using an availability score for each of the enterprise applications in the subset;

outputting, via the presentation layer and using on a display device, an indication comparing each of the enterprise applications in the subset to a corresponding predetermined benchmark, wherein the indication comprises a prioritization of each of the enterprise applications in the subset as compared with the other enterprise applications in the subset and wherein the prioritization identifies at least one of the enterprise applications as a high priority based upon at least one goal of the enterprise and wherein the prioritization identifies an application to maintain to prevent unavailability of the at least one high priority enterprise application;

responsive to the identification of the application as to be maintained, implementing, by the processor, at least one of patching and updating of the application identified as to be maintained to prevent unavailability of the at least one high priority application; and testing, by the processor, the at least one of patched and updated application to ensure the at least one of a patch and an update implemented has addressed a fault or flaw associated with the identification of the application as to be maintained.

13. The method of claim 12, wherein the testing is done in real time.

14. The method of claim 12, wherein the risk score comprises: at least one factor from a group consisting of criticality score, gaps, and historical outages; wherein the at least one factor is weighted based on service goals and business priorities.

15. The system of claim 12, wherein technical readiness comprises: at least one factor from a group consisting of presentation, application, database, and storage; wherein the at least one factor is weighted.

16. The system of claim 12, wherein operational maturity comprises: at least one factor from a group consisting of configuration scan, monitor, capacity, documentation, and data backup; wherein the at least one factor is weighted.

* * * * *